Oct. 17, 1961
C. S. MERTLER
3,005,076
THERMOSTATIC DEVICE
Filed May 19, 1958
2 Sheets-Sheet 1
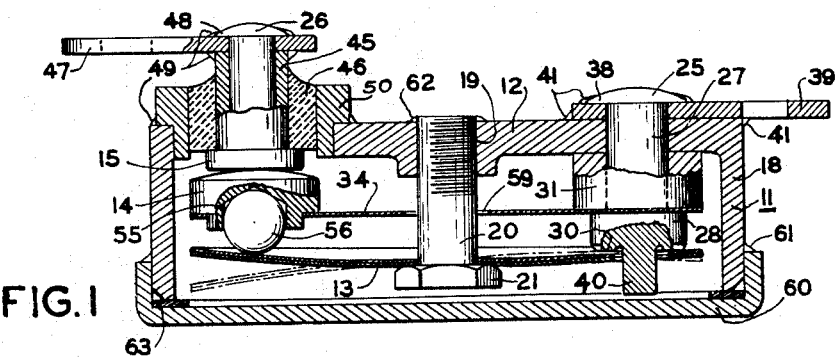
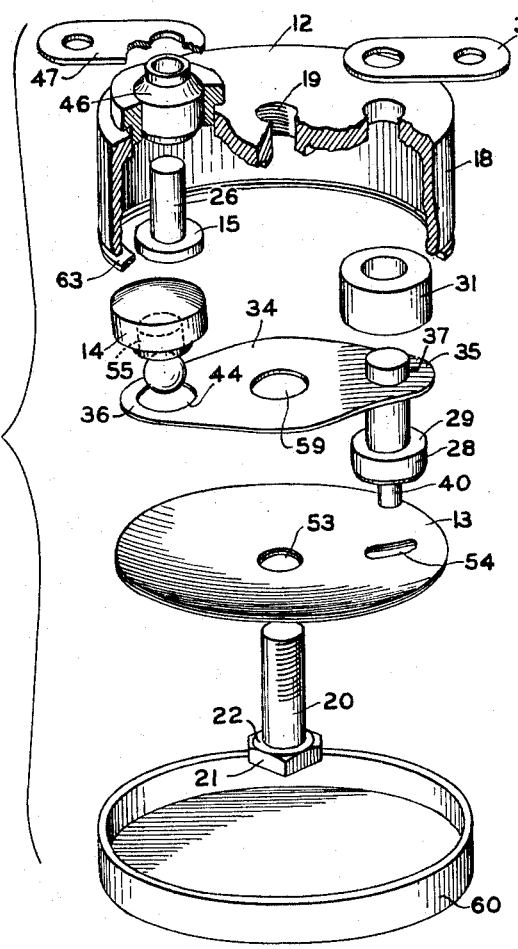
INVENTOR.
CHARLES S. MERTLER
BY Woodling and Krost
  Atty.

Oct. 17, 1961     C. S. MERTLER     3,005,076
THERMOSTATIC DEVICE

Filed May 19, 1958     2 Sheets—Sheet 2

INVENTOR.
CHARLES S. MERTLER
BY Woodling and Krost,
atty.

United States Patent Office 3,005,076
Patented Oct. 17, 1961

3,005,076
THERMOSTATIC DEVICE
Charles S. Mertler, Mansfield, Ohio, assignor to Stevens Manufacturing Company, Inc., a corporation of Ohio
Filed May 19, 1958, Ser. No. 736,175
14 Claims. (Cl. 200—138)

The invention relates in general to thermostatic devices and more particularly to snap acting thermostatic switches.

The prior art has known many forms of thermostatic switches including both snap action and creep action types. The creep action type, wherein an electrical contact or operating portion is slowly moved by a bimetallic element or other thermally responsive element, is generally characterized by a smaller temperature differential between off and on switch conditions. The snap acting type generally has a considerably larger temperature differential but is used where slow make and break of the contacts cannot be tolerated for any one of several reasons, a primary one being that slow make, and especially slow break, of a contact causes arcing at the contacts under certain types of loads aggravated by direct current operation or inductive loads.

Many applications require a small temperature differential where the temperature of the appliance is desired to be regulated closely, and under such circumstances the creep action thermostat has heretofore been used even though severe arcing at the contacts causes pitting and burning necessitating frequent repalcement of the thermostat.

An object of the present invention is to provide a snap acting thermostatic switch with a small temperature differential.

Another object of the invention is to provide a snap acting thermostat having a temperature differential which may be as small as many ordinary creep action prior art thermostats.

Still another object of the invention is to provide a thermostat which has parctically no change of calibration during life.

Another object of the invention is to provide a small differential thermostat which has practically no change of calibration.

Other objects and a fuller understanding of this invention may be had by referring to the following description and claims, taken in conjunction with the accompanying drawings, in which:

FIGURE 1 is a sectional elevational view of a thermostat embodying the invention;

FIGURE 2 is an exploded isometric view of the thermostat of FIGURE 1;

Figure 5:
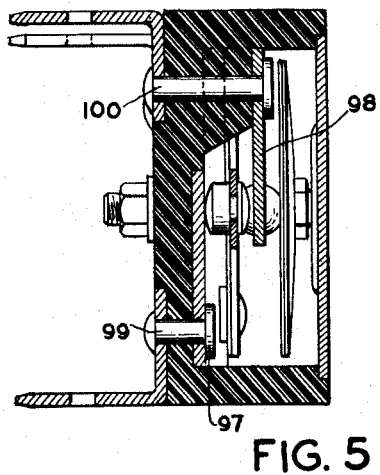
FIGURE 5 is an elevational sectional view on the line 5—5 of FIGURE 3.

The present invention relates to a snap acting thermostatic device and generally is an improvement over the type of snap acting thermostatic switch shown in my Patent No. 2,543,040. FIGURES 1 and 2 show a preferred form of the invention embodied in a thermostatic device 11 which includes generally a circular metallic base 12, a bimetallic element 13, a movable contact 14, and a fixed contact 15. The metal base 12 has an upstanding circular wall 18 defining a generally cup-shaped housing for the entire thermostat 11. The base 12 has a central threaded aperture 19 receiving a central threaded adjusting screw 20. This adjusting screw 20 may be considered a central post having a head 21 with an underside 22 facing the base 12 and with this head 21 positioned within the height of the upstanding wall 18.

The thermostat 11 has first and second terminals 25 and 26 for external connection to an electrical circuit. The first terminal 25 includes a post 27 extending through the base 12 and having an enlarged portion 28 which provides inwardly and outwardly facing shoulders 29 and 30, respectively. A spacer 31 surrounds the post 27. A leaf spring or resilient blades 34 has first and second portions 35 and 36, respectively, with the first portion 35 having an aperture 37 closely received on the post 27 and positioned between the spacer 31 and the inwardly facing shoulder 29. The terminal post 27 may be headed over as shown at 38 as a rivet head to securely fix the first end 35 of the contact blade 34 to the base 12. At the same time a terminal lug 39 may be fastened in the riveted assembly.

A circular post extension 40 is provided on the first terminal 25 outboard of the outwardly facing shoulder 30. The periphery of the terminal lug 39 may be soldered at 41 to establish that the first terminal 25 will be a hermetically sealed terminal.

The movable contact 14 is carried in an aperture 44 at the outboard end of the spring blade 34. The movable contact 14 is positioned for selective engagement with the fixed contact 15 which is connected to the inner end of the second terminal 26. This second terminal 26 may be mounted in a metal sleeve 45 in turn mounted in an insulating sleeve 46, such as a glass sleeve. A satisfactory hermetically sealed terminal may be formed by fusing the glass sleeve 46 to the metal sleeve 45 and to an eyelet 50. A terminal lug 47 abuts the outer end of the metal sleeve 45 and the second terminal 26 may be headed over at 48 as a rivet to rivet together the assembly of the fixed contact 15, second terminal 26, and terminal lug 47. The lug 47 may be soldered to the metal sleeve 45 and the eyelet 50 soldered at 49 to the base 12 to make a hermetically sealed second terminal 26.

Th bimetallic element 13 is a circular dished element which may be considered to be concavo-convex and has a central aperture 58 closely received on the adjusting screw 20 against the underside 22 of the head 21. The close but free fit of the aperture 53 eliminates lost motion and contributes to the small temperature differential of the entire thermostat 11. An elongated radial slot 54 is provided in the bimetallic element 13 near one edge thereof and the width dimension of this slot 54 is closely received on the circular post extension 40. The close but free fit between the post extension 40 and the sides of the slot 54 contribute to the constant calibration of the thermostat during life by preventing any rotation whatever of the bimetallic element 13. The fact that the slot 54 is radially elongated permits free and unhampered snap acting movements from concave to convex positions during operation.

An insulated spacer, shown as a glass ball 56, is closely received within a recess 55 in the obverse face of contact 14, and acts against the bimetallic element 13. The glass ball 56 is generally opposite the circular post extension 40, and in the embodiment shown both are on a diametral line of the bimetallic element 13. The resilient blade 34 has an enlarged aperture 59 loosely surrounding the adjusting screw 20 to be in insulated spaced relationship therewith. A metal cap 60 may be soldered at 61 to the wall 18 to make a hermetically sealed thermostat 11. A gasket 63 may be squeezed under pressure between the cover 60 and the wall 18 to prevent any flux from entering the housing during soldering. This is desirable in the small sizes because of the close spacing of parts, especially to keep the flux from contaminating the contacts. A suitable gasket material for the soldering temperatures involved is Teflon. The base 12 as well as the cap 60 may be of any suitable metal, and copper provides a good heat conducting material. The thermostat 11 is shown as a grounded circuit device because the first terminal 25 is metallically and electrically connected to the base 12 and cap 60. This provides good heat conductivity from the cap 60 which conveniently may be placed in heat exchange relationship with the device to be controlled, to provide good heat conductivity directly to the bimetallic element 13.

*Operation*

The thermostat 11 in FIGURE 1 has been shown in the circuit closed position with the contacts 14 and 15 in engagement, caused by the bimetallic element 13 being snapped into its concave position relative to the base 12. The initial shape of the leaf spring 34, shown in FIGURE 2, is curved downwardly toward the bimetallic element 13. The mounting at the first terminal 25 and its natural resiliency causes it to separate the contacts 14 and 15.

Upon sufficient temperature change the bimetallic element 13 will snap over to the convex position shown in dot-dash lines and the natural resiliency of the spring blade 34 will cause it to follow so as to move the movable contact 14 out of engagement with the fixed contact 15. This natural resiliency is sufficient to maintain the ball 56 in contact with the recess 55 and in contact with the bimetallic element 13. The natural resiliency of this spring blade 34 acting through the glass ball 56 also pivots the bimetallic element 13 at the head 21 so as to maintain the bimetallic element 13 in engagement with the outwardly facing shoulder 30. The amount of movement of the snap acting bimetallic element 13 has been exaggerated in the drawings for clarity but actually may not be any more than ten or fifteen thousandths of an inch. The fact that the bimetallic element 13 is always maintained in contact with the outwardly facing shoulder 30 because of the resiliency of the spring blade 34 means that the portion of the bimetallic element 13 at the glass ball 56 has twice the expected amount of movement. This provides not only a very fast make and break but also provides an extra contact separation to handle larger amounts of voltage.

The glass ball 56 may be very nearly perfectly spherical to maintain constant the position of the bimetallic element 13 for each closed position during cycling during life. This aids materially in the constant calibration of the entire thermostat. On direct current operation a spike and a corresponding crater are formed on the contacts 14 and 15; and because the spring blade 34 has one end rigidly fastened to the base 12, this spike and crater will always mesh to contribute to the constant calibration during life. The glass ball 56 isolates both electrically and thermally the bimetallic element 13 from the current carrying contact blade 34; and since there is no current flow through the bimetallic element 13, this eliminates any heating of the bimetallic element because of the current flow which could give a false heat to the bimetallic element and thus affect the temperature calibration of the entire unit.

The bimetallic disc 13 is made of metal which under current manufacturing practices has a certain grain orientation. This is because two metals, ultimately forming the bimetal, have been rolled together in a certain direction which causes this grain structure. The fact that the radial slot 54 closely engages the circular post extension 40 prevents any rotation of this bimetallic element 13; and if this rotation were permitted, it could change the calibration of the thermostat 11 by six or seven degrees just because of the difference in grain orientation relative to the orientation between the first and second terminals 25 and 26. A thermostat constructed in accordance with FIGURES 1 and 2 has been constructed and operated and has a temperature differential of only two to four degrees Fahrenheit whereas my former thermostat of Patent 2,543,040 had a minimum temperature differential of about ten degrees Fahrenheit. In the present invention the smaller temperature differential of about two degrees is achieved on low temperature applications wherein active bimetals may be used and the higher temperature differential of about four degrees is achieved on higher temperature applications wherein a less active bimetal must be used. The bimetal type and the amount of curvature of the bimetallic element 13 determine the closing temperature in an application wherein the contacts close upon temperature rise, and the adjustment of the adjusting screw 20 controls the opening temperature. The adjusting screw 20 in this embodiment shown in FIGURES 1 and 2 is adapted to be pre-set at the factory during assembly and once adjusted and calibrated the outer end of the screw 20 may be soldered at 62 to complete the hermetic sealing of the entire thermostat 11. The thermostat constructed in accordance with FIGURES 1 and 2 has been found to have very good calibration throughout life aided by the close but free fit of the bimetallic element 13 on the central post 20, the close but free fit of the radial slot 54 on the post extension 40, the constant diameter of the glass ball 56, and the fact that the movable contact 14 always engages the same place on the fixed contact 15. In actual practice over 1,400,000 cycles of off and on operation of this thermostat have been recorded without any change in calibration.

Figure 3:
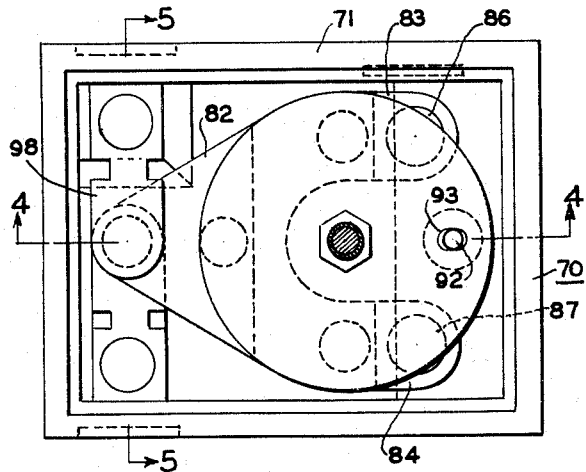
FIGURE 3 is a top view with the cover removed of a modified form of thermostat.
Figure 7:
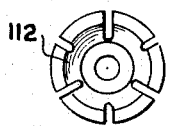
FIGURE 7 is a plan view of a spring washer used in the thermostat of FIGURE 6.
Figure 4:
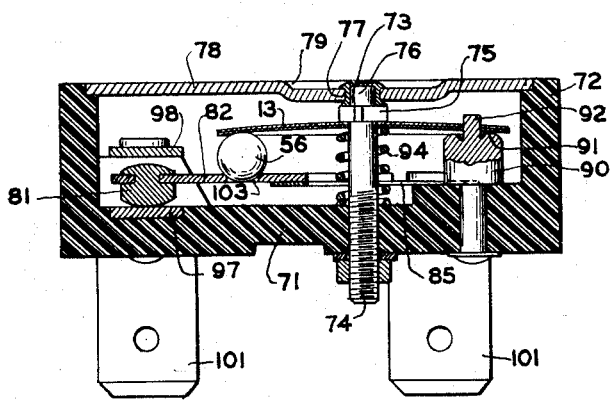
FIGURE 4 is an elevational sectional view on the line 4—4 of FIGURE 3.

FIGURES 3, 4, and 5 show another modification of the invention and show a thermostat 70 having an insulated base 71 in this case shown as being rectangular. The base 71 is cup-shaped having walls 72. The circular bimetallic element 13 is again used, this time engaging the inwardly facing shoulder 73 on an adjusting screw 74 which is threaded in the base 71. The shoulder 73 is provided by an enlarged portion 75 and a reduced diameter portion 76 is provided on the screw 74 to be soldered in an aperture 77 in a metallic cover plate 78. The cover plate 78 has a depression 79 in which the aperture 77 is located so that, when the adjusting screw 74 is put in its calibrated or adjusted position and soldered at the aperture 77, the end of this adjusting screw 74 will not project beyond the outer surface of the cover plate 78. This permits a flat mounting surface for the cover plate 78 for good heat transfer with the electrical unit or appliance, the temperature of which is being controlled. A double faced movable contact 81 is carried on a contact blade 82 which is generally U-shaped and has legs 83 and 84. A resilient hinge plate 85 is provided as part of the contact blade 82. A first terminal 86 extends through the base 71 and connects to and mounts the first leg 83 of the contact blade 82 by a riveted connection. A rivet 87 mounts the other leg 84 to the base 71. An abutment post 90 is fixedly carried in the base 71 and has a shoulder 91 with a circular post extension 92. The post extension 92 passes through the radially elongated slot 93 similar to slot 54 in FIGURES 1 and 2. The bimetallic element 13 is caused to engage the inwardly facing shoulder 73 by a coil spring 94 and the surface of the bimetallic element 13 near the slot 93 abuts the shoulder 91.

The double faced movable contact 81 may engage either a second contact 97 or a third contact 98; and hence, the thermostat 70 is a double throw thermostatic switch. The second contact 97 is connected to and carried by a second terminal 99, and the third contact 98 is connected to and carried by a third terminal 100. The terminals 86, 99, and 100 extend to the exterior of the base 71 and may be provided with suitable connections such as the blade type terminals 101 shown in the drawing. The contact blade 82 has a circular aperture or recess 103 which receives the glass ball 56. The glass ball 56 acts on a portion of the bimetallic element 13 near the edge thereof generally diametrically opposite the radial slot 93. The curvature of the bimetallic element 13 has been exaggerated in the drawings for clarity but actually in its snap acting movements between concave and convex positions the movement of this bimetallic element 13 is insufficient to permit the glass ball 56 to come out of the recess 103 even though the glass ball may not be in engagement with the bimetallic element 13 in the convex position. The natural resiliency of the contact blade 82 caused by the resilient hinge plate 85 urges the movable contact 81 toward the third contact 98 and toward the bimetallic element 13. FIGURE 4 shows the thermostat with the bimetallic element 13 in its concave position relative to the base 71; and when the element 13 has snapped over to the convex position, such as upon a temperature rise, the natural resiliency of the contact blade 82 causes separation of contacts 81 and 97 and engagement of the contacts 81 and 98. In order to maintain contact pressure between contacts 81 and 98 there will be a slight space between the glass ball 56 and the bimetallic element 13 when in this convex position.

The thermostat may be adjusted in its operating temperature by positioning the adjusting screw 74, and once calibrated the screw 74 may be soldered to the cover plate 78. This solder connection provides good heat conductivity from the cover plate 78 to the bimetallic element 13. The coil spring 94 maintains the bimetallic element 13 in engagement with the inwardly facing shoulder 73 for both concave and convex positions of the bimetallic element 13. The spring 94 also maintains the bimetallic element 13 in contact with the shoulder 91 as the bimetallic element snaps from the convex position to the concave position shown so that the left end of the bimetallic element 13 acts through the ball 56 to move the contact blade 82 with a very quick snap acting movement into the position shown in FIGURE 4.

Figure 6:
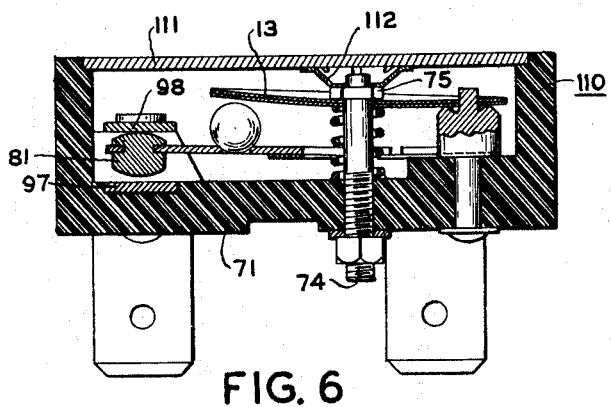
FIGURE 6 is an elevational sectional view of a modified form of thermostat.

FIGURE 6 shows a slightly modified form of thermostat 110 which is generally similar to the thermostat 70 except that the cover plate 111 does not have either the depression 79 or the aperture 77 of the cover plate 78. The thermostat 110 includes a washer shaped spring 112 which may be a form of a Belleville spring engaging the enlarged portion 75 and engaging the underside of the cover plate 111. This spring 112 permits adjustment movements of the adjusting screw 74 and also may be made of material such as beryllium copper to provide good heat conductivity from the cover plate 111 to the adjusting screw 74 and thus to the bimetallic element 13. The FIGURE 6 shows the thermostat 110 with the bimetallic element 13 in the convex position relative to the base 71 so that the movable contact 81 is engaging the third contact 98 rather than the second contact 97.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A snap acting thermostat comprising a base, a resilient blade having first and second portions, first terminal means on said base mounting said first portion of said resilient blade to said base, a movable contact carried on the second portion of said resilient blade, a second terminal extending through said base in insulated relationship with respect to said first terminal, a second contact on the interior end of said second terminal and positioned for selective contact with said movable contact, a concave-convex bimetallic element having first and second sides, an abutment to engage said first side of said bimetallic element, a post on said first terminal means to engage said second side of said bimetallic element near one edge thereof, means to prevent rotation of said bimetallic element, a recess in said resilient blade, an insulated spacer fitting within said recess and acting between said resilient blade and said second side of said bimetallic element at a point generally opposite said post and said resilient blade resiliently urging said insulated spacer toward said bimetallic element, whereby said bimetallic element is adapted to snap between concave and convex positions upon temperature changes to move said movable contact through the agency of said insulated spacer into and out of engagement with said second contact.

2. A snap acting disc thermostat comprising a base, a resilient blade having first and second portions, first terminal means on said base mounting said first portion of said resilient blade to said base, a movable contact carried on the second portion of said resilient blade, a second terminal extending through said base in insulated relationship with respect to said first terminal, a second contact on the interior end of said second terminal and positioned for selective contact with said movable contact, a circular dished bimetallic element having first and second sides, an adjustable screw abutment to engage substantially centrally said first side of said bimetallic element, a post on said first terminal means to engage said second side of said bimetallic element near one edge thereof, means including said post and a radially elongated slot in said bimetallic element closely received thereon to prevent rotation of said bimetallic element, a circular recess in said resilient blade, an insulated spacer fitting within said recess and acting between said resilient blade and said second side of said bimetallic element at a point near the edge generally opposite said post, and said resilient blade resiliently urging said insulated spacer toward said bimetallic element, whereby said bimetallic element is adapted to snap between concave and convex positions upon temperature changes to move said movable contact through the agency of said insulated spacer into and out of engagement with said second contact.

3. A snap acting disc thermostat comprising a base, a threaded aperture extending through said base, a threaded adjusting screw in said aperture and having a head remote from said base, first and second terminals on said base disposed generally on opposite sides of the axis of said screw, an enlarged portion on said first terminal providing an inwardly facing shoulder, a spring blade fixedly carried on said first terminal engaging said inwardly facing shoulder, said second terminal extending through said base in insulated relationship with respect to said first terminal, a movable contact carried on said spring blade, a second contact on the interior end of said second terminal and positioned for selective contact with said movable contact, a circular dished bimetallic element having a central aperture closely received on said screw against the underside of the head thereof, means relatively insulating said spring blade and said bimetallic element, a circular post having an outwardly facing shoulder and fixed relative to said base, a radially elongated slot in said bimetallic element near one edge thereof and closely received as to the width dimension thereof on said circular post and adapted to abut said outwardly facing shoulder, a circular recess in said spring blade, an insulated spacer fitting within said recess and acting between said spring blade and said bimetallic element, and said leaf spring having resiliency urging said insulated spacer toward said bimetallic eelment, whereby said bimetallic element is adapted to snap between concave and convex positions upon temperature changes to move said movable contact through the agency of said insulated spacer into and out of engagement with said second contact.

4. A snap acting disc thermostat comprising a base, a threaded aperture extending through said base, a threaded adjusting screw in said aperture and having a head remote from said base, first and second terminals on said base disposed generally on opposite sides of the axis of said screw, an enlarged portion on said first terminal providing an inwardly facing shoulder, a leaf spring fixedly carried on said first terminal engaging said inwardly facing shoulder, said second terminal extending through said base in insulated relationship with respect to said first terminal, a movable contact carried on the outboard end of said leaf spring, a second contact on the interior end of said second terminal and positioned for selective contact with said movable contact, means relatively insulating said leaf spring and said adjusting screw, a circular dished bimetallic element having a central aperture closely received on said screw against the underside of the head thereof, a circular post having an outwardly facing shoulder and fixed relative to said base, a radially elongated slot in said bimetallic element near one edge thereof and closely received as to the width dimension thereof on said circular post and adapted to abut said outwardly facing shoulder, a circular recess in said leaf spring, an insulated spacer fitting within said recess and acting between said leaf spring and said bimetallic element, said leaf spring having natural resiliency urging said insulated spacer toward engagement with said bimetallic element, and means providing good heat transfer relationship of said bimetallic element with the ambient, whereby said bimetallic element is adapted to snap between concave and convex positions upon temperature changes to move said movable contact through the agency of said insulated spacer into and out of engagement with said second contact.

5. A snap acting disc thermostat comprising a base and an upstanding wall thereon, a generally central threaded aperture extending through said base, a threaded adjusting screw in said aperture and having a head remote from said base yet within the height of said wall, first and second terminals on said base disposed generally on opposite sides of said screw, an enlarged portion on said first terminal providing an inwardly facing shoulder, a leaf spring fixedly carried on said first terminal engaging said inwardly facing shoulder, said second terminal extending through said base in insulated relationship with respect to said first terminal, a movable contact carried on the outboard end of said leaf spring, a second contact on the interior end of said second terminal and positioned for selective contact with said movable contact, a surface in said leaf spring to loosely surround said threaded adjusting screw in insulated spaced relationship therewith, a circular dished bimetallic element having an aperture closely received on said screw against the underside of the head thereof, a circular post having an outwardly facing shoulder and fixed relative to said base, a radially elongated slot in said bimetallic element near one edge thereof and closely received as to the width dimension thereof on said circular post and adapted to abut said outwardly facing shoulder, a circular recess in said leaf spring, a glass ball fitting within said recess and acting between said leaf spring and said bimetallic element, said leaf spring having resiliency urging said ball toward said bimetallic element, a metallic cover engaging said wall and providing metallic contact with said bimetallic element, whereby said bimetallic element is adapted to snap between concave and convex positions upon temperature changes to move said movable contact through the agency of said glass ball into and out of engagement with said second contact.

6. A thermostat comprising a base, a central post on said base and having a head remote from and with the underside facing said base, first and second terminals disposed on different sides of said post, at least one of said terminals being insulated from said base, a spring blade fixedly carried on said first terminal, a movable contact carried on the outboard end of said spring blade, a second contact on said second terminal and positioned for selective contact with said movable contact, an aperture in said spring blade to surround said central post in insulated spaced relationship therewith, a disc-shaped snap acting bimetallic element having an aperture closely received on said post against the underside of the head thereof, a second post fixed relative to said base, a radially elongated slot in said bimetallic element near one edge thereof and closely received as to the width dimension thereof on said second post, a circular recess in said spring blade, an insulating ball fitting within said recess and acting between said spring blade and said bimetallic element, said spring blade having resiliency urging said ball toward said bimetallic element, whereby siad bimetallic element is adapted to snap between concave and convex positions upon temperature changes to move said movable contact through the agency of said ball into and out of engagement with said second contact.

7. A thermostat compirsing a base, a central post having a head remote from said base, first and second terminals disposed on opposite sides of said post, a U-shaped spring blade having two legs fixedly carried on said base and one thereof connected to said first terminal, a movable contact carried on the outboard end of said spring blade, a second contact on said second terminal and positioned for selective contact with said movable contact, the two legs of said spring blade providing an aperture to surround said central post in insulated spaced relationship therewith, a snap acting bimetallic element having an aperture closely received on said post against the underside of the head thereof, a second post fixed relative to said base, a radially elongated slot in said bimetallic element near one edge thereof and closely received as to the width dimension thereof on said second post, a circular recess in said spring blade, an insulating ball fitting within said recess and acting between said movable contact and said bimetallic element, whereby said bimetallic element is adapted to snap between concave and convex positions upon temperature changes to move said movable contact through the agency of said ball into and out of engagement with said second contact.

8. A thermostat, comprising, in combination, a base, a post having a shoulder remote from said base, a movable contact carried on said base, a second contact on said base positioned for selective contact by said movable contact, a bimetallic element having an aperture received on said post against said shoulder, means to move said movable contact from said bimetallic element, a metallic cover carried generally opposite said base, and heat transfer means directly connecting said cover and said post to conduct heat to said bimetallic element from said cover.

9. A thermostat, in combination, a base, a first post having a shoulder remote from said base, screw means adjusting said post relative to said base, first and second terminals disposed on said base, a spring blade connected to said first terminal, a movable contact carried on the outboard end of said spring blade, a second contact on said second terminal positioned for selective contact by said movable contact, a snap-acting disc bimetallic element having a central aperture colsely received on said post against the underside of the shoulder thereof, an abutment post engaging said bimetallic element near one edge thereof, an insulating spacer acting between said movable contact and said bimetallic element, a metallic cover carried on said base, an aperture in said cover, said first post extending into said cover aperture, and solder interconnecting said cover and said first post to conduct heat to said bimetallic element from said cover.

10. A thermostat, comprising, in combination, a base, a first post having a shoulder remote from said base, screw means adjusting said post relative to said base, first and second terminals disposed on said base, a spring blade connected to said first terminal, a movable contact carried on the outboard end of said spring blade, a second contact on said second contact on said second terminal positioned for selecttive contact by said movable contact, a snap-acting disc bimetallic element having a central aperture closely received on said post against the underside of the shoulder thereof, an abutment post engaging said bimetallic element near one edge thereof to prevent rotation of said bimetallic element, an insulating spacer acting between said movable contact and said bimetallic element, a metallic cover carried on said base, and a spring washer positioned between said shoulder on said first post and said cover to conduct heat to said bimetallic element from said cover.

11. A thermostat comprising a base, a central post having a head remote from said base, first and second terminals disposed on opposite sides of said post, one of said terminals being insulated from said base, a spring blade fixedly carried on said first terminal, a movable contact carried on the outboard end of said spring blade, a second contact on said second terminal and positioned for selective contact with said movable contact, an aperture in said spring blade to surround said central post in insulated spaced relationship therewith, a snap acting bimetallic element having an aperture closely received on said post against the underside of the head thereof, a radially elongated slot in said bimetallic element near one edge thereof and closely received as to the width dimension thereof on said first terminal to prevent rotation of said bimetallic element, a circular recess in the obverse side of said movable contact, an insulating ball closely fitting within said recess and acting between said movable contact and said bimetallic element, the diameter of said ball being greater than the depth of said recess to provide a portion of said ball extending outside said recess to abut said bimetallic element, whereby said bimetallic element is adapted to snap between concave and convex positions upon temperature changes to move said movable contact through the agency of said ball into and out of engagement with said second contact.

12. A thermostat comprising a circular base, a central threaded aperture extending through said base, an adjusting screw in said aperture and having a head remote from said base, first and second terminals on a diameter of said circular base and substantially equally spaced on opposite sides of said screw, a first post at said first terminal extending through said base, a spring blade fixedly carried on said post, a second terminal post at said second terminal extending through said base, one of said terminals being insulated from said base, a movable contact carried on the outboard end of said spring blade, a second contact on said second terminal post and positioned for selective contact with said movable contact, an aperture in said spring blade to surround said adjusting screw in spaced relationship therewith, a circular bimetallic element having an aperture closely received on said screw against the underside of the head thereof, a radially elongated slot in said bimetallic element near one edge thereof and closely received as to the width dimension thereof on said first post, a circular recess in one of said movable contact and said bimetallic element, an insulating ball fitting within said recess and abutting and acting between said movable contact and said bimetallic element, whereby said bimetallic element is adapted to snap between concave and convex positions upon temperature changes to move said movable contact through the agency of said ball into and out of engagement with said second contact.

13. A thermostat comprising a circular metal cup including a circular base and an upstanding circular wall, a central threaded aperture extending through said base, an adjusting screw in said aperture and having a head remote from said base yet within the height of said cup, first and second terminals on a diameter of said circular base and substantially equally spaced on opposite sides of said screw, a first post at said first terminal extending through said base, a leaf spring fixedly carried on said post, a second terminal post at said second terminal extending through said base in insulated relationship therewith, a movable contact carried on the outboard end of said leaf spring, a second contact on the interior end of said second terminal post and positioned for selective contact with said movable contact, an aperture in said leaf spring to loosely surround said central threaded adjusting screw in spaced relationship therewith, a circular dished bimetallic element having an aperture closely received on said screw against the underside of the head thereof, an outwardly facing shoulder on said first post, a radially elongated slot in said bimetallic element near one edge thereof and closely received as to the width dimension thereof on said first post and adapted to abut said outwardly facing shoulder, a circular recess in the obverse side of said movable contact, a glass ball closely fitting within said recess and acting between said movable contact and said bimetallic element, the diameter of said ball being greater than the depth of said recess to provide a portion of said ball extending outside said recess to abut said bimetallic element, whereby said bimetallic element is adapted to snap between concave and convex positions upon temperature changes to move said movable contact through the agency of said glass ball into and out of engagement with said second contact.

14. A hermetically sealed snap acting disc thermostat comprising a circular copper cup including a circular base and an upstanding circular wall, a central threaded aperture extending through said base, a central threaded adjusting screw in said aperture and having a head remote from said base yet within the height of said cup, first and second terminals on a diameter of said circular base and substantially equally spaced on opposite sides of said screw, a first post at said first terminal extending through said base in electrical contact therewith, an enlarged portion on said first post providing inwardly and outwardly facing shoulders thereon, a leaf spring fixedly carried on said post engaging said inwardly facing shoulder, a second terminal post at said second terminal extending through said base in insulated relationship therewith, a movable contact carried on the outboard end of said leaf spring, a second contact on the interior end of said second terminal post and positioned for selective contact with said movable contact, an aperture in said leaf spring to loosely surround said central threaded adjusting screw in insulated spaced relationship therewith, a circular dished bimetallic element having an aperture closely received on said screw against the underside of the head thereof, a circular post extension on said first post outboard of said enlarged portion, a radially elongated slot in said bimetallic element near one edge thereof and closely received as to the width dimension thereof on said first post extension and adapted to abut said outwardly facing shoulder, a circular recess in the obverse side of said movable contact, a glass ball closely fitting within said recess and acting between said movable contact and said bimetallic element, the diameter of said ball being greater than the depth of said recess to provide a portion of said ball extending outside said recess to abut said bimetallic element, a copper cap engaging said wall and hermetically sealing said cup, whereby said bimetallic element is adapted to snap between concave and convex positions upon temperature changes to move said movable contact through the agency of said glass ball into and out of engagement with said second contact.

References Cited in the file of this patent
UNITED STATES PATENTS

| 1,867,379 | Ross | July 12, 1932 |
| 1,972,364 | Spencer | Sept. 4, 1934 |
| 2,239,540 | Spencer | Apr. 22, 1941 |
| 2,456,153 | Schell | Dec. 14, 1948 |
| 2,543,040 | Mertler | Feb. 27, 1951 |
| 2,753,421 | Mertler | July 3, 1956 |
| 2,785,251 | Cassidy | Mar. 12, 1957 |
| 2,806,107 | Miklas | Sept. 10, 1957 |